United States Patent [19]
Carrier et al.

[11] Patent Number: 5,717,268
[45] Date of Patent: Feb. 10, 1998

[54] ELECTRIC MOTOR WITH TACHOMETER SIGNAL GENERATOR

[75] Inventors: Mark Emery Carrier, Unionville; Raymond Henry LaChance, Canaan, both of Conn.

[73] Assignee: Philips Electronics North America Corp., N.Y., N.Y.

[21] Appl. No.: 664,486

[22] Filed: Jun. 17, 1996

[51] Int. Cl.$^6$ .............................. H02K 11/00; H02K 3/00
[52] U.S. Cl. .................... 310/156; 310/68 B; 310/168; 310/67 R
[58] Field of Search ..................... 310/68 B, 168, 310/156, 42, 67 R; 29/598

[56] References Cited

U.S. PATENT DOCUMENTS

| | | | |
|---|---|---|---|
| 4,364,005 | 12/1982 | Kohzai et al. | 322/31 |
| 4,755,701 | 7/1988 | Shikama | 310/156 |
| 4,902,923 | 2/1990 | Okauchi | 310/268 |
| 4,975,607 | 12/1990 | Hara et al. | 310/67 R |
| 5,079,468 | 1/1992 | Sata | 310/168 |
| 5,126,613 | 6/1992 | Choi | 310/208 |
| 5,177,389 | 1/1993 | Schalk | 310/171 |
| 5,252,876 | 10/1993 | Kawai et al. | 310/184 |
| 5,319,271 | 6/1994 | Shimada et al. | 310/68 B |
| 5,383,265 | 1/1995 | Nishizawa | 29/598 |
| 5,410,201 | 4/1995 | Tanaka et al. | 310/68 B |
| 5,418,414 | 5/1995 | Ackermann et al. | 310/156 |

FOREIGN PATENT DOCUMENTS

| | | | |
|---|---|---|---|
| 0128468A2 | 12/1984 | European Pat. Off. | H02K 29/02 |
| 3331755C2 | 3/1993 | Germany | H02K 29/00 |
| 62-64247A | 3/1987 | Japan | H02K 29/00 |
| 670528A | 3/1994 | Japan | H02K 29/14 |
| 6105520A | 4/1994 | Japan | H02K 29/14 |

*Primary Examiner*—Thomas M. Dougherty
*Assistant Examiner*—Tran N. Nguyen
*Attorney, Agent, or Firm*—Robert J. Kraus

[57] ABSTRACT

A permanent magnet electric motor including a rotor having an annular arrangement of field magnets for rotation around an axis relative to a stator. An annular FG magnet arrangement affixed to an end of the rotor cooperates with an adjacent FG coil to produce a signal indicative of the rotor speed. A shunt washer of magnetically permeable material is interposed between the field magnet arrangement and the FG magnet arrangement.

10 Claims, 2 Drawing Sheets

5,717,268

ELECTRIC MOTOR WITH TACHOMETER SIGNAL GENERATOR

BACKGROUND OF THE INVENTION

1. Field of the Invention

The invention relates to an electric motor and, in particular, to a motor with a frequency generator for producing a signal indicative of motor speed.

2. Description of Related Art

U.S. Pat. No. 5,383,265 describes a motor having an FG (frequency generator) magnet fixed around the outer periphery of a rotor frame. A main magnet is fixed to an inner periphery of the rotor frame for rotation around a stator which is arranged on a supporting substrate. Also arranged on the substrate, opposite the FG magnet, is an FG coil for generating a voltage having a frequency proportional to the rate of rotation of the rotor. The FG coil is formed on the substrate in a zigzag or serpentine pattern having a multiplicity of rectangular segments. No information is given in the patent as to the number or directions of magnetic poles in the FG magnet relative to the FG coil segments.

SUMMARY OF THE INVENTION

It is an object of the invention to provide an electric motor having a frequency generator of the FG coil-and-magnet type which produces a signal that is an accurate indication of rotor speed.

In accordance with the invention, the motor has a central axis of rotation and includes, centered on the axis, a stator, a rotor including annular field-magnet means for rotation around the axis relative to the stator, annular FG magnet means affixed to an end of the rotor, and an FG coil formed in an annular serpentine pattern disposed adjacent the annular FG magnet means. The stator has a number of radially-extending tynes around which field coils are wound for producing respective magnetic fields. The field-magnet means includes a number of adjacent circumferentially-arranged field magnets, each producing a radially-directed field which is polarized oppositely from adjacent ones of the field magnets. The annular FG magnet means includes N adjacent circumferentially-arranged FG magnet segments, each producing an axially-directed field which is polarized oppositely from adjacent ones of the segments. The annular serpentine pattern comprises m×N segments, where m is preferably equal to one.

Surprisingly, it has been found that the FG coil produces a signal having a substantial harmonic frequency component if the annular FG magnet means is affixed directly to the rotor. This signal component can be sufficiently strong to cause instability of a speed-control system that controls the magnitude of drive current supplied to a motor in response to the signal. It has been experimentally determined that the troublesome harmonic frequency component originates from interaction of the rotor and stator magnetic fields, even though the principal components of these fields are directed radially rather than toward the FG coil. Thus, further in accordance with the invention, the motor includes an annular magnetically permeable shunt member interposed between the annular field-magnet means and the annular FG magnet means. It has been found that the simple addition of this shunt member effects a reduction of the troublesome harmonic component to an insignificant magnitude.

DESCRIPTION OF THE PREFERRED EMBODIMENTS

Figure 1:
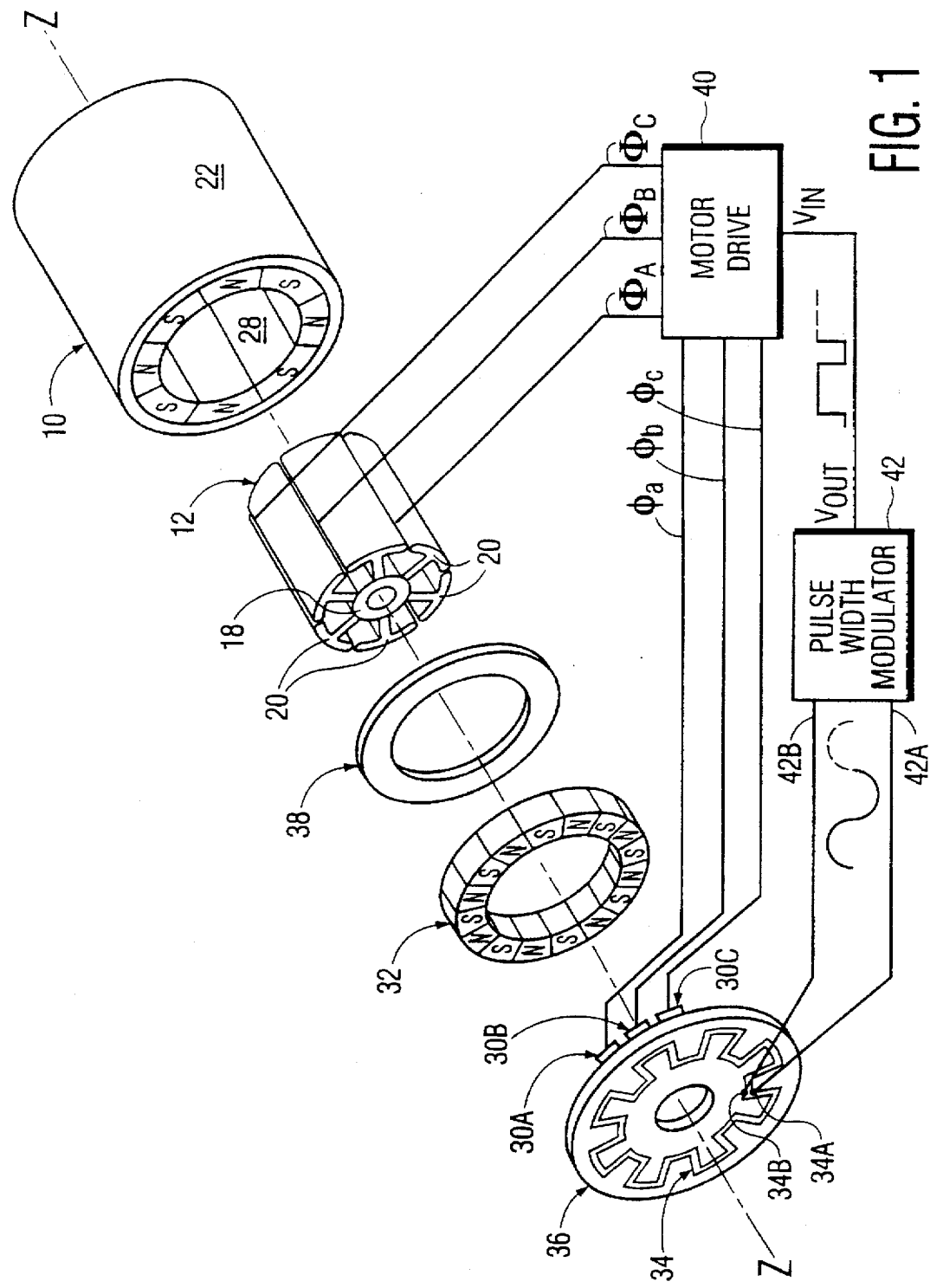
FIG. 1 is an exploded view, partly in schematic, of an embodiment of a motor in accordance with the invention and a representative speed-control system.
Figure 2:
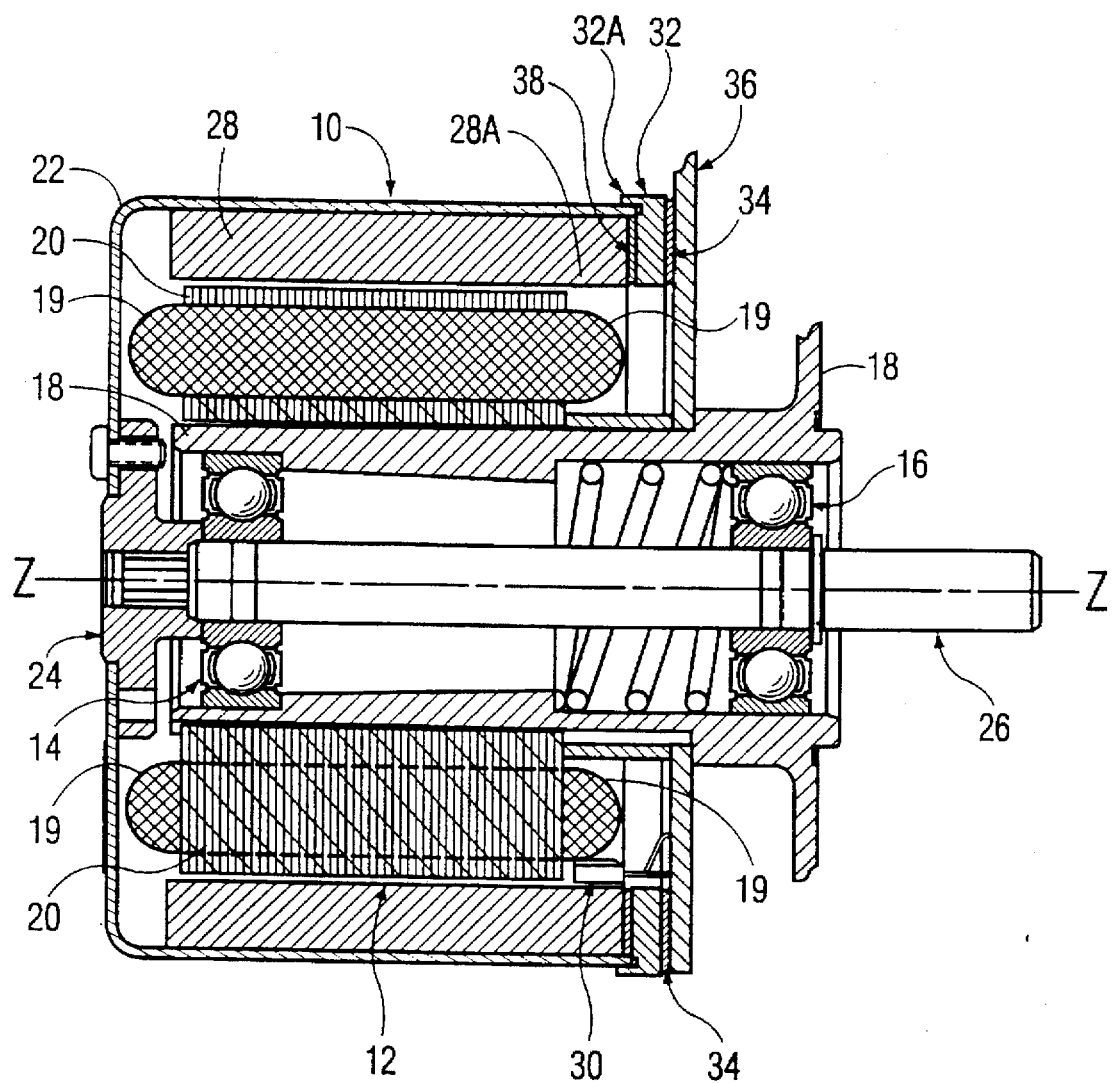
FIG. 2 is a cross-sectional view of an embodiment of an assembled motor in accordance with the invention.

The motor embodiments illustrated in FIGS. 1 and 2 are similar, but FIG. 2 shows more detail and an alternative position for the FG coil. Specifically, FIG. 1 shows a brushless three-phase DC motor, while the cross-sectional view of FIG. 2 is more generally applicable to motors having any number of phases.

Referring to the figures, the motor includes a rotor 10 that is rotatably attached to a stator 12 by means of first and second ball bearings 14 and 16, respectively, for rotation about a central axis Z—Z. The stator includes a central spindle 18 of a non-magnetically permeable material such as zinc or aluminum to which are attached, by staking or gluing, a number of radially-extending tynes 20 formed of laminated plates of a magnetically permeable material such as silicon steel. Advantageously, the stator tynes may have the construction that is the subject of U.S. Pat. No. 5,418,414, which is hereby incorporated by reference. As is well known in the art, a field coil 19 is wound around each of the tynes for enabling energization of the stator.

The rotor 10 also includes a cup-shaped housing 22 of soft magnetic material such as low-carbon steel. A bushing 24 of non-magnetically permeable material, such as zinc, brass or aluminum, is bolted centrally within the bottom of the rotor housing for press fitting the rotor onto a knurled end of a shaft 26 of a strong, non-corrosive material such as stainless steel. The shaft is centered about the central axis Z—Z and is attached by means such as an adhesive to the inner races of the bearings 14 and 16 for enabling the rotor to rotate about the stator.

The rotor 10 further includes an annular field magnet arrangement 28 that is rigidly attached to an inner surface of the housing 22 by means such as an adhesive. The arrangement 28 includes a number of adjacent circumferentially-arranged field magnet segments for producing alternately-polarized radially-directed fields, as is illustrated in FIG. 1. In other words, each of the field magnet segments is permanently radially magnetized with a polarity that is opposite from adjacent ones of the field magnet segments. These magnet segments may be discrete elements, but are preferably formed in an integral cylindrical body of a hard magnetic material such as ceramic, as is well known in the art. Conventionally, the number of field magnets in arrangement 28 relative to the number of tynes in the stator are chosen to achieve an acceptable balance between torque ripple and switching losses.

The annular field magnet arrangement 28 is dimensioned radially to reach within close proximity of the laminated stator tynes 20, while avoiding contact, and is dimensioned axially to extend across the entire axial length of the stator tynes 20. Preferably, as is shown in FIG. 2, an end portion 28A of the field magnet arrangement extends axially beyond the field coils 19 that are wound around the tynes 20. This facilitates optimal positioning of means for detecting the instantaneous position of the rotor during operation. This position-detecting means includes a field-magnet-sensing element 30 for each stator phase.

In a brushless three-phase motor, as is illustrated in FIG. 1, three field-magnet-sensing elements 30, i.e. elements 30A,30B,30C, are situated at different angular positions around axis Z—Z for detecting the instantaneous passing of the radially-directed poles of the field magnets 28. In this exemplary embodiment, the elements 30 are Hall cells mounted on a printed-circuit board 36 that is attached to the stator spindle 18. As is shown in FIG. 2, each of the elements 30 is disposed within and situated proximate end portion 28A of the field magnet arrangement.

The motor also has speed detecting means including an annular FG magnet arrangement 32, and an FG coil arrangement 34. The FG magnet arrangement 32 includes N adjacent circumferentially-arranged FG magnet segments for producing alternately-polarized axially-directed fields, as is illustrated in FIG. 1. As in the case of the field magnet arrangement, the FG magnet arrangement may be formed of discrete magnet elements, but preferably the magnetic segments are formed in an integral body of hard magnetic material such as ceramic. The number N determines the maximum accuracy at which the rotor speed may be measured.

As is shown in FIG. 2, the FG magnet arrangement 32 is affixed to an end of the rotor 10 via an interposed shunt member 38 of magnetically permeable material. In a preferred embodiment, a metallic washer of a soft magnetic material such as 2010 low-carbon steel is utilized for the shunt member 38. The washer has an outer diameter equal to that of the housing 22 and has an inner diameter equal to that of the field magnet arrangement 32. One side of the washer covers the ends of the housing and field magnet arrangement, while the opposite side contacts a radially-extending annular surface of the FG magnet arrangement 32. The arrangement 32 includes an integral axially-extending circumferential lip 32A, having an inner diameter corresponding to the outer diameters of the washer and the housing. The lip 32A facilitates positioning of the washer and FG magnet arrangement relative to each other and to the ends of the housing and field magnet arrangement, when they are attached to each other. Attachment is achieved by means such as an epoxy or an ultra-violet-cured adhesive.

The FG coil 34 is formed by an annular serpentine conductor pattern provided on one side of the printed-circuit board 36. The coil 34 may be provided, as shown in FIG. 1, on the side of the printed-circuit board 36 that is remote from FG magnet arrangement 32, which has the advantage of greater isolation from any axial components of the stator field. Alternatively, as is shown in FIG. 2, the coil 34 may be provided on the side of board 36 that is proximate the FG magnet arrangement, which has the advantage of better coupling with the axial components of the magnetic fields produced by the FG magnet segments. In either case, the extension 28A effects axial positioning of the FG magnet arrangement, and thus of the FG coil, sufficiently far from the stator field to provide effective isolation.

In FIG. 1, the FG coil 34 is shown as a two-winding printed conductive coil extending from a terminal 34A to a terminal 34B. Preferably, each winding has the same number of segments m as there are magnet segments N in the FG magnet arrangement 32, i.e. m=N. The amplitude of the output signal produced by the coil will be at a maximum if m=N and each coil segment has the same angular width as that of the magnetic segments in the arrangement 32. To the extent that the number of windings in the coil can be increased, without substantially changing this preferred angular width for the coil segments in each winding, the output signal amplitude will be substantially increased by adding windings. In a practical embodiment that has been constructed and tested, both the FG magnet arrangement and the FG coil arrangement had 90 segments, each with a 4° angular width, and the coil had two windings.

For the sake of completeness, FIG. 1 also shows, in block diagram form, control circuitry for operating the motor in response to rotor position and speed signals produced by the Hall cells 30A,30B,30C and the FG coil 34. This control circuitry includes a motor drive circuit 40 and a pulse width modulator circuit 42.

The motor drive circuit 40 has an input $V_{IN}$ for receiving the rotor speed signal, three inputs $\phi_a,\phi_b,\phi_c$ for receiving the rotor position signals, and three outputs $\Phi_A,\Phi_B,\Phi_C$ that are electrically connected to the respectively-phased field coil windings 19. Optimally, the Hall cells are positioned to detect the passage of the field magnet poles such that they collectively generate a 3-bit binary code. This code is applied to the three inputs $\phi_a,\phi_b,\phi_c$ of motor drive circuit 40 to cause successive energization of the field coils 19 at times which effect production of maximum torque output by the motor.

The pulse width modulator circuit 42 has inputs 42A and 42B that are electrically connected to the respective terminals 34A and 34B of the FG coil 34. This coil produces a sinusoidal signal having a frequency that varies with the rotor speed. Circuit 42 produces a speed signal at an output $V_{OUT}$ in the form of a square wave having a duty cycle that varies inversely with the frequency of the sinusoidal signal. The speed signal directly controls the duty cycle of DC power applied by the motor drive circuit 40 to the field coil windings.

We claim:

1. An electric motor having a central axis of rotation and including, centered on the axis:

a. a stator having a number of radially-extending tynes around which field coils are wound for producing respective magnetic fields;

b. a rotor including annular field-magnet means for rotation around the axis relative to the stator, said field-magnet means including a number of adjacent circumferentially-arranged field magnets, each producing a radially-directed field which is polarized oppositely from adjacent ones of said field magnets;

c. annular frequency-generator magnet means affixed to an end of the rotor, axially separated from the annular field-magnet means and including N adjacent circumferentially-arranged frequency-generator magnet segments, each producing an axially-directed field which is polarized oppositely from adjacent ones of said segments;

d. a frequency-generator coil formed in an annular serpentine pattern, comprising m×N segments, where m and N are integers, disposed adjacent the annular frequency-generator magnet means for producing a signal indicative of the rotor speed; and e. an annular shunt member comprising a magnetically permeable material interposed between the annular field-magnet means and the annular frequency-generator magnet means.

2. An electric motor as in claim 1 where the annular shunt member comprises a soft magnetic material.

3. An electric motor as in claim 2 where the annular shunt member comprises a washer consisting essentially of low-carbon steel.

4. An electric motor as in claim 1 where the frequency-generator coil comprises a plurality of windings.

5. An electric motor as in claim 4 where the windings are concentric.

6. An electric motor as in claim 1 where the segments of the frequency-generator coil have a rectangular shape.

7. An electric motor as in claim 1 where m=1.

8. An electric motor as in claim 4 where the number of segments in each of the windings is equal to N.

9. An electric motor as in claim 1 where N is equal to 90.

10. An electric motor as in claim 1 where the annular field-magnet means is affixed to the annular frequency-generator magnet means via the annular shunt member.

* * * * *